United States Patent [19]
Shimizu et al.

[11] Patent Number: 4,829,393
[45] Date of Patent: May 9, 1989

[54] AUTOMATIC MAGNETIC RECORDING MEDIUM EJECTING MECHANISM FOR USE IN A MAGNETIC RECORDING MEDIUM DRIVING UNIT

[75] Inventors: Makoto Shimizu; Akira Sato, both of Tokyo, Japan

[73] Assignee: Oki Electric Industry Co., Ltd., Tokyo, Japan

[21] Appl. No.: 111,516

[22] Filed: Oct. 21, 1987

[30] Foreign Application Priority Data

Oct. 27, 1986 [JP] Japan ................ 61-255272
Feb. 18, 1987 [JP] Japan ................ 62-33530

[51] Int. Cl.⁴ .................... G11B 17/028; G11B 17/04
[52] U.S. Cl. .................... 360/71; 360/99.07
[58] Field of Search ............ 360/97, 99, 71

[56] References Cited

U.S. PATENT DOCUMENTS

| | | | |
|---|---|---|---|
| 4,656,544 | 4/1987 | Yamanouchi | 360/97 |
| 4,670,802 | 6/1987 | Ogawa et al. | 360/97 |
| 4,716,477 | 12/1987 | Uehara | 360/97 |
| 4,723,185 | 2/1988 | Maeda | 360/97 |
| 4,736,357 | 4/1988 | Uehara et al. | 360/97 |
| 4,772,965 | 9/1988 | Kato et al. | 360/97 |
| 4,774,608 | 9/1988 | Horiuchi et al. | 360/99 |

Primary Examiner—Robert S. Tupper
Attorney, Agent, or Firm—Wenderoth, Lind & Ponack

[57] ABSTRACT

An automatic magnetic recording medium ejecting mechanism for use in combination with a magnetic disk driving unit employs the spindle motor of the magnetic disk driving unit as a driving source for ejecting a magnetic disk cassette therefrom. The automatic magnetic recording medium ejecting mechanism includes, as essential components thereof, a gear mechanism for transmitting the rotative force of the spindle motor to an ejecting plate so that the ejecting plate is moved to a standby position where the ejecting plate is locked by a pressing and locking device which locks the ejecting plate at the standby position and presses the magnetic disk cassette for ejection until a magnetic disk cassette is inserted in the magnetic disk driving unit, a switch for detecting the completion of operation of the spindle motor for moving the ejecting plate to the standby position, and a switch control device interlocked with the gear mechanism for controlling the switch. The gear mechanism includes a pinion which disconnects a subsequent gear train from the spindle motor when the spindle motor operates in the normal direction for a read/write operation, and connects the subsequent gear train to the spindle motor when the spindle motor operates in the reverse direction for ejecting the magnetic disk cassette.

6 Claims, 6 Drawing Sheets

AUTOMATIC MAGNETIC RECORDING MEDIUM EJECTING MECHANISM FOR USE IN A MAGNETIC RECORDING MEDIUM DRIVING UNIT

BACKGROUND OF THE INVENTION

1. Field of the Invention:

The present invention relates to an automatic magnetic recording medium ejecting mechanism and, more specifically, to an automatic magnetic recording medium ejecting mechanism mainly for use in a magnetic disk driving device.

2. Description of the Prior Art:

Various automatic magnetic disk ejecting mechanisms for use in magnetic disk driving devices have hitherto been proposed.

A known automatic magnetic disk ejecting mechanism, for example, is driven by the rotative force of a spindle motor transmitted thereto through a reduction gear mechanism to eject a magnetic disk cassette automatically. In this known automatic magnetic disk ejecting mechanism, the spindle motor must be disconnected from the automatic magnetic disk ejecting mechanism so that the rotative force of the spindle motor will not be transmitted to the automatic magnetic disk ejecting mechanism in an operating mode other than an automatic magnetic disk ejecting mode. To disconnect the spindle motor from the automatic magnetic disk ejecting mechanism, a semigear is provided in the transmission line interconnecting the spindle motor and the automatic magnetic disk ejecting mechanism, and the semigear is brought to an operative position in the automatic magnetic disk ejecting mode to transmit the rotative force of the spindle motor to the automatic magnetic disk ejecting mechanism through the reduction gear mechanism. The semigear is moved to and moved away from the operative position by an individual driving means other than the spindle motor. The provision of the driving means for interlocking the automatic magnetic disk driving mechanism with the spindle motor in addition to the spindle motor makes it difficult to construct the automatic magnetic disk ejecting mechanism in a compact construction and increases the cost of the automatic magnetic disk ejecting mechanism.

SUMMARY OF THE INVENTION

Accordingly, it is a principal object of the present invention to provide an automatic magnetic recording medium ejecting mechanism capable of utilizing the power of the spindle motor for ejecting a magnetic recording medium without requiring any additional driving means, capable of being formed in a compact construction, and capable of being manufactured at a low cost.

It is another object of the present invention to provide an automatic magnetic recording medium ejecting mechanism capable of surely preventing an uncontrolled magnetic recording medium ejecting operation by inhibiting the magnetic recording medium ejecting operation when a magnetic recording medium ejection signal is not provided.

According to a first aspect of the present invention, an automatic magnetic recording medium ejecting mechanism comprises a cassette carrier for carrying a magnetic recording medium cassette inserted through an inlet opening in a magnetic recording medium driving unit, an ejecting plate for moving the cassette carrier in vertical or transverse directions, pressing and locking means for pressing the magnetic recording medium cassette in an ejecting direction and for locking the ejecting plate at a standby position, driving means for rotatively driving the magnetic recording medium in one direction for read/write operation and for moving the ejecting plate to the standby position, a gear mechanism which transmits the rotative force of the driving means to the ejecting plate only when the driving means is reversed to move the ejecting plate to the standby position and to make the pressing and locking means lock the ejecting plate at the standby position and press the magnetic recording medium cassette for ejection, a switch for detecting the completion of operation of the driving means for moving the ejecting plate to the standby position, and a sliding member interlocked with the gear mechanism for controlling the switch.

According to a second aspect of the present invention, an automatic magnetic recording medium ejecting mechanism comprises a cassette carrier for carrying a magnetic recording medium cassette inserted through an inlet opening in a magnetic recording medium driving unit, an ejecting plate for moving the cassette carrier in vertical or transverse directions, pressing and locking means of pressing the magnetic recording medium cassette in an ejecting direction and for locking the ejecting plate at a standby position, driving means for rotatively driving the magnetic recording medium for rotation in one direction for read/write operation and for moving the ejecting plate to the standby position, a gear mechanism which transmits the rotative force of the driving means to the ejecting plate only when the driving means is reversed to move the ejecting plate to the standby position and to make the pressing and locking means lock the ejecting plate at the standby position and press the magnetic recording medium cassette for ejection, a switch for detecting the completion of operation of the driving means for moving the ejecting plate to the standby position, a sliding member interlocked with the gear mechanism for controlling the switch, and switch holding means which operates in synchronism with the magnetic recording medium cassette receiving operation of the ejecting plate to hold the switch on while the magnetic recording medium cassette is inserted in the magnetic recording medium driving unit.

According to the first aspect of the present invention, while the driving means is driving the magnetic recording medium in the normal direction for read/write operation, the gear mechanism is disengaged so that the driving power of the driving means is transmitted only to the magnetic recording medium. On the other hand, when the driving means is reversed, the gear mechanism is engaged so that the ejecting plate and the cassette carrier are moved by the driving means, then the magnetic recording medium cassette is separated from the driving means together with the cassette carrier, the pressing and locking means is actuated to eject the magnetic recording medium cassette through the inlet opening by a recoiling action of the pressing means.

The automatic magnetic recording medium ejecting mechanism in the second aspect of the present invention operates in a manner somewhat different from that of the automatic magnetic recording medium ejecting mechanism in the first aspect of the present invention, when the magnetic recording medium driving unit loaded with a magnetic recording medium is restarted after disconnecting the magnetic recording medium driving unit from a power source or when the magnetic recording medium driving unit starts operation after the interruption of power supply thereto. In such a case, the holding means interlocked with the ejecting plate holds the switch on even if the gear mechanism is disconnected from the driving means and thereby the sliding member is released free to turn the switch off, so that the magnetic recording medium cassette set in the magnetic recording medium driving unit is not ejected upon restarting the magnetic recording medium driving unit.

The above and other objects, features and advantages of the present invention will become apparent from the following description taken in conjunction with the accompanying drawings.

BRIEF DESCRIPTION OF THE DRAWINGS

FIG. 6 is an enlarged plan view, similar to FIG. 5, showing the respective positions of the components of the switch holding mechanism of FIG. 5 when the switch is held on.

DESCRIPTION OF THE PREFERRED EMBODIMENTS

First Embodiment:

An automatic magnetic recording medium ejecting mechanism in a first embodiment of the present invention will be described as applied to a magnetic disk driving unit with reference to FIGS. 1 to 3.

The components of the magnetic disk driving unit are mounted on a box-shaped chassis 10. A magnetic disk cassette 11 is inserted in the magnetic disk driving unit through an inlet opening on the left side of the magnetic disk driving unit as viewed in FIG. 2. A spindle motor 12 is disposed in the central portion of the left-hand section of the chassis 10. A chuck 13 and a driving pin 14 are provided on the spindle motor 12.

Figure 2:
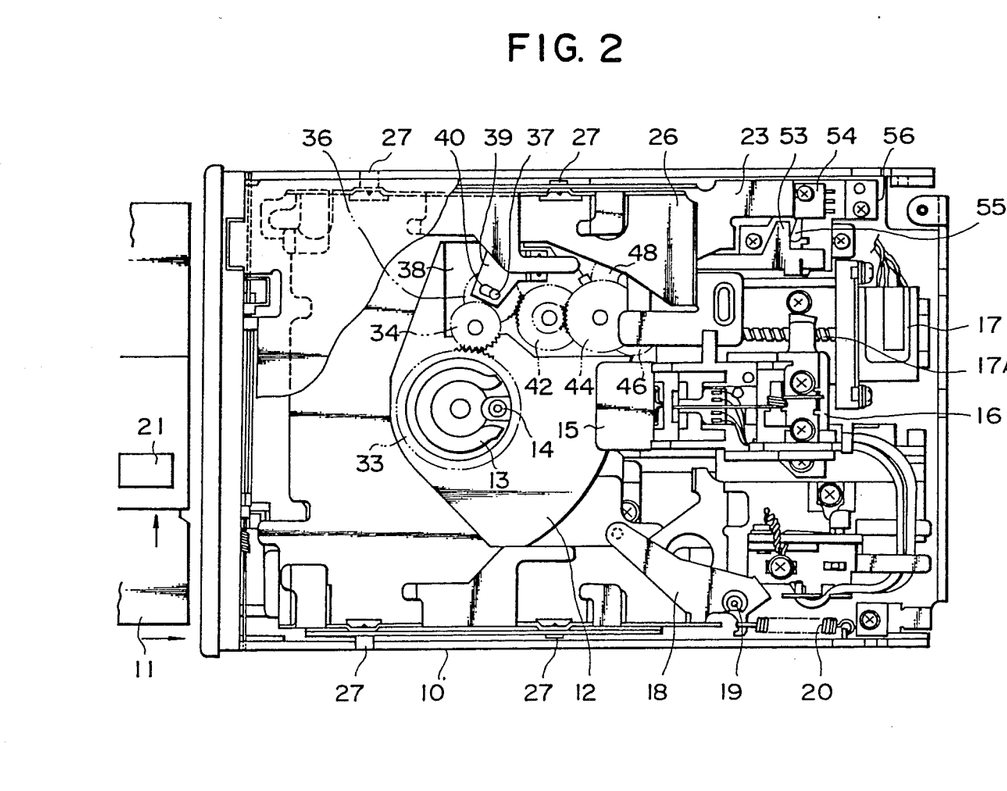
FIG. 2 is a plan view of a magnetic disk driving unit incorporating the magnetic recording medium ejecting mechanism of FIG. 1.
Figure 3:
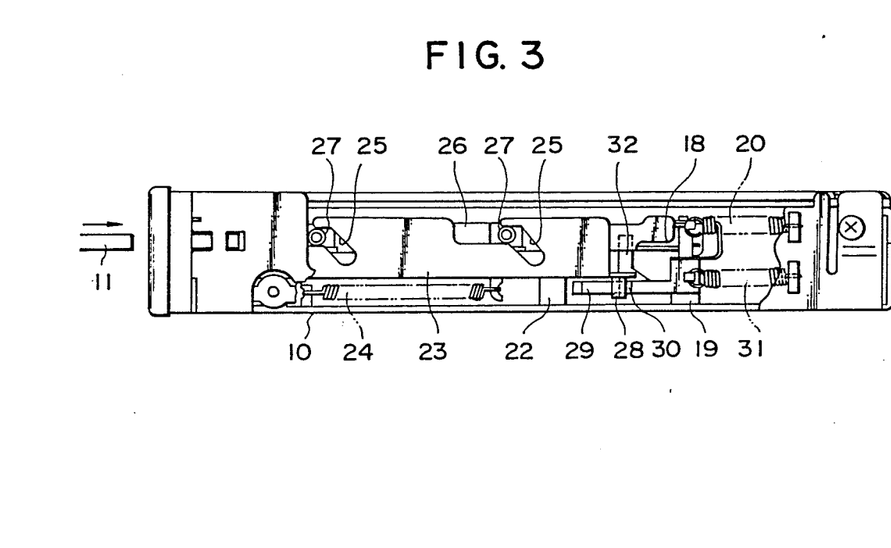
FIG. 3 is a side elevation of the magnetic disk driving unit of FIG. 2.

Referring to FIG. 2, a magnetic head carriage 16 mounted with magnetic heads 15 is provided in the central portion of the right-hand section of the chassis 10 so as to be driven through a feed screw 17a for lateral movement by a stepping motor 17. A shutter opening lever 18 is supported pivotally on a pivot pin 19 in the lower right-hand section of the chassis 10 and is urged in a counterclockwise direction by a coil spring 20. When a magnetic disk cassette 11 is inserted in the magnetic disk driving unit, the shutter 21 thereof is opened by the shutter opening lever 18. The magnetic disk cassette 11 is set on the chuck 13, and then the magnetic disk contained in the magnetic disk cassette 11 is driven for rotation by the driving pin 14 to read information from or to write information in the magnetic disk.

Figure 1:
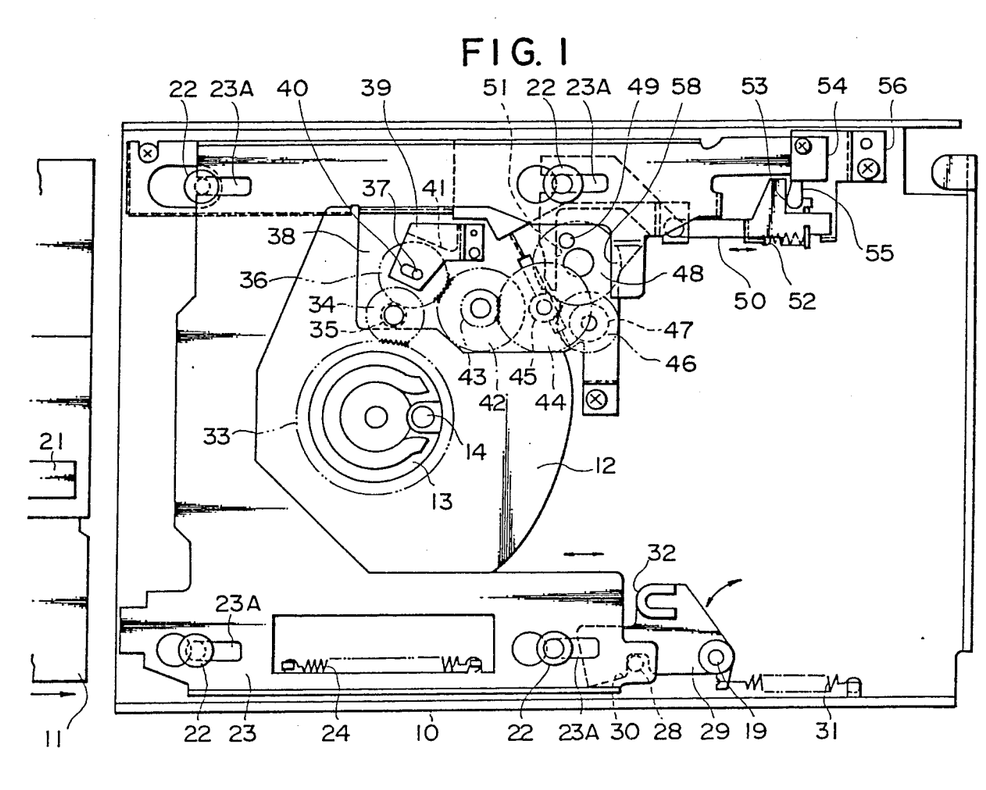
FIG. 1 is a plan view of an automatic magnetic recording medium ejecting mechanism, in a first embodiment, according to the present invention.

As shown in FIG. 1, four posts 22 are fixed upright to the chassis 10 so as to engage four slots 23A, respectively, formed in a substantially U-shaped ejecting plate 23 to guide the ejecting plate 23 for lateral movement. The ejecting plate 23 is urged continuously to the left, as viewed in FIGS. 1 to 3, by a coil spring 24. Two inclined guide grooves 25 are formed in each of the opposite side walls of the ejecting plate 23, as shown in FIG. 3. A cassette carrier 26 for carrying the magnetic disk cassette 11 is disposed above the ejecting plate 23 (FIG. 3) and pins 27 projecting from the side walls of the cassette carrier 26 are in engagement with respective of the inclined guide grooves 25 of the ejecting plate 23. A pin 28 projecting from the lower surface of the right-hand end of the ejecting plate 23 is in engagement with a recess 30 formed in a latch lever 29. The latch lever 29 is supported pivotally on the pivot pin 19 pivotally supporting the shutter opening lever 18 and is urged in a counterclockwise direction by a coil spring 31. The latch lever 29 is provided in the upper surface of the free end thereof with a U-shaped projection 32 as shown in FIG. 1. When inserted in the magnetic disk driving unit, the front side of the magnetic disk cassette 11 collides against the projection 32 to turn the latch lever 29 in a clockwise direction, and thereby the ejecting plate 23 is released from the latch lever 29 and is moved to the left by the coil spring 24. As the ejecting plate 23 is moved to the left, the pins 27 attached to the cassette carrier 26 move along the inclined grooves 25, so that the cassette carrier 26 carrying the magnetic disk cassette 11 is lowered and is set on the posts 22. The features of the present invention will be described hereinafter with reference to FIG. 1.

A gear mechanism is provided to transmit the rotative force of the spindle motor 12 to the ejecting plate 23 in ejecting the magnetic disk cassette 11 from the magnetic disk driving unit. The gear mechanism comprises a gear 33, a gear 34, a pinion 35, a planetary pinion 36, a gear 42, a pinion 43, a gear 44, a pinion 45, a gear 46, a pinion 47 and a gear 48. The gear 33 formed integrally with the chuck 13 engages the gear 34 coaxially having the pinion 35 fixed to the lower surface thereof. The pinion 35 engages the planetary pinion 36. The shaft 37 of the planetary pinion 36 is received in slots 40 formed in a frame 38 and a bracket 39 so that the planetary pinion 36 is able to revolve round the pinion 35 within a predetermined angular range. The bracket 39 is pressed by a spring 41 so as to maintain the engagement of the planetary pinion 36 and the pinion 35. The planetary pinion 36 further engages the gear 42 coaxially having the pinion 43 fixed thereto and engaging the gear 44. The pinion 45 coaxially fixed to the lower surface of the gear 44 engages the gear 46. The pinion 47 coaxially fixed to the gear 46 engages the gear 48. A roller 49 is supported rotatably on the upper surface of the gear 48 so as to revolve round the axis of rotation of the gear 48 as the gear 48 rotates.

When the gear 33 is rotated in the normal direction (clockwise direction) by the spindle motor 12 in driving the magnetic disk of the magnetic disk cassette 11, the planetary pinion 36 is caused to move counterclockwise around the pinion 35 to disengage from the gear 42. When the gear 33 is rotated in the reverse direction (counterclockwise direction), the planetary pinion 36 engages the gear 42 to transmit the rotative force of the spindle motor 12 to the gear 42. Thus, the planetary pinion 36 functions as a clutching member as well as a power transmitting member.

These gears and pinions are supported pivotally on the frame 38 to form a reduction gear for transmitting the rotative force of the spindle motor 12 at a reduced speed.

The roller 49 provided on the gear 48 is in engagement with a projection 51 of a sliding member 50. The sliding member 50 is biased to the right by a coil spring 52. Another projection 53 formed at the right-hand end of the sliding member 50 presses the actuator 55 of a switch 54. The switch 54 is fixed to a bracket 56 and the actuator 55 is urged to the left by the internal spring of the switch 54. A projection 58 is formed in the ejecting plate 23 so as to be located opposite to the projection 51 of the sliding member 50. When the gear 48 is rotated, the roller 49 provided on the gear 48 pushes the projections 51 and 58.

In operation, upon the insertion of the magnetic disk cassette 11 in the magnetic disk driving unit from the left as viewed in the drawings, the shutter 21 is moved in the direction indicated by an arrow in FIG. 2 directed toward the shutter by the shutter opening lever 18 and, at the same time, the front side of the magnetic disk cassette 11 engages the latch lever 29 to turn the latch lever 29 clockwise. Consequently, the pin 28 provided at the free end of the ejecting plate 23 is released from the latch lever 29 and thereby the ejecting plate 23 is moved to the left by the tension of the coil spring 24 guiding the pins 27 fixed to the cassette carrier 26 downward along the guide grooves 25 formed in the side walls thereof (FIG. 3). Thus, the cassette carrier 26 carrying the magnetic disk cassette 11 is lowered and is placed on the four posts 22. Simultaneously with the downward movement of the magnetic disk cassette 11, the upper and lower magnetic heads 15 (FIG. 2) are brought into contact with the upper and lower surfaces, respectively, of the magnetic disk contained in the magnetic dish cassette 11 through the windows uncovered by movement of the shutter. Thus the magnetic disk cassette 11 is set in place for information recording or reading operation.

Then, the spindle motor 12 is actuated to rotate the magnetic disk contained in the magnetic disk cassette 11 in a clockwise direction and the magnetic heads 15 read information from or write information in the magnetic disk. The stepping motor 17 moves the magnetic head carriage 16 mounted with the magnetic heads 15 through the feed screw 17A to shift the magnetic heads 15 relative to the tracks of the magnetic disk.

When the magnetic disk driving unit is stopped, the planetary pinion 36 is separated from the gear 42 so that the magnetic disk driving unit is able to be restarted without trouble.

In ejecting the magnetic disk cassette 11 from the magnetic disk driving unit, a controller, not shown, provides a signal to reverse the spindle motor 12. Then, the gear 33 is rotated in the reverse direction to make the planetary pinion 36 move clockwise round the pinion 35 through the gear 34 and the pinion 35 and engage the gear 42, so that the rotative force of the spindle motor 12 is transmitted through the gears and pinions 42 to 47 at a reduced speed to the gear 48 to rotate the gear 48 counterclockwise. Then, the roller 49 provided on the gear 48 revolves counterclockwise around the axis of rotation of the gear 48 to push the ejecting plate 23 at the projection 58 and thereby the ejecting plate 23 is shifted to the right. As the ejecting plate 23 is shifted to the right, the pins 27 provided on the cassette carrier 26 move upward along the guide grooves 25 formed in the side walls of the ejecting plate 23 (FIG. 3) to raise the cassette carrier 26 mounted with the magnetic disk cassette 11. Upon the arrival of the ejecting plate 23 at the right-hand end position, the recess 30 of the latch lever 29 biased counterclockwise engages the pin 28 of the ejecting plate 23 to retain the ejecting plate 23 in a state as shown in FIG. 1. At the same time, the raised magnetic disk cassette 11 is ejected automatically from the magnetic disk driving unit by the projection 32 of the latch lever 29 which is urged resiliently counterclockwise by the coil spring 31.

On the other hand, the spindle motor 12 is reversed further to continue rotating the gear 48 counterclockwise, so that the roller 49 pushes the projection 51 of the sliding member 50 to shift the sliding member 50 to the left. Consequently, the projection 53 formed in the right-hand end of the sliding member 50 releases the actuator 55 of the switch 54, and then the switch 54 provides a signal to stop the reverse operation of the spindle motor 12. If the roller 49 is stopped at a position on the right side with respect to the center of the gear 48, the movement of the ejecting plate to the left in inserting the next magnetic disk cassette in the magnetic disk driving unit is obstructed by the roller 49, and hence the roller 49 must be stopped at the left limit position. Accordingly, the switch 54 provides a signal to stop the spindle motor 12 after confirming that the roller 49 has arrived at a position where the roller 49 will not interfere with the ejecting plate 23 when the ejecting plate 23 is moved to the left.

Upon the connection of the magnetic disk driving unit to the power source for the next magnetic disk driving operation, the planetary pinion 36 is disengaged from the gear 42 to make the spindle motor 12 ready to drive the magnetic disk contained in the magnetic disk cassette 11. In this state, since the pinions and gears 42 to 48 are free to rotate, the sliding member 50 is shifted to the right by the coil spring 52, and thereby the roller 49 is moved to the right by the projection 51 of the sliding member 50. Thus, upon the connection of the magnetic disk driving unit to the power source, the controller, not shown, executes a series of initial procedures to check the position of the roller 49 from the condition of the switch 54, and to control the magnetic disk driving unit so as to disengage the planetary pinion 36 from the gear 42 after moving the roller 49 to the left limit position.

Ordinarily, no magnetic disk cassette is inserted in the magnetic disk driving unit during a series of the initial procedures. However, when the power supply is interrupted during the operation of the magnetic disk driving unit or when the magnetic disk driving unit is connected to the power source after inserting a magnetic disk cassette 11 in the magnetic disk driving unit, it is possible, according to the position of the roller 49, that the magnetic disk cassette 11 is ejected from the magnetic disk driving unit through the initial procedures upon the supply of power after the interruption of power supply or upon the connection of the magnetic disk driving unit to the power source. Therefore, further improvement is desirable to obviate such an undesirable operation. An automatic magnetic recording medium ejecting mechanism, in a second embodiment, according to the present invention incorporates further improvements to obviate such an undesirable operation.

Figure 4:
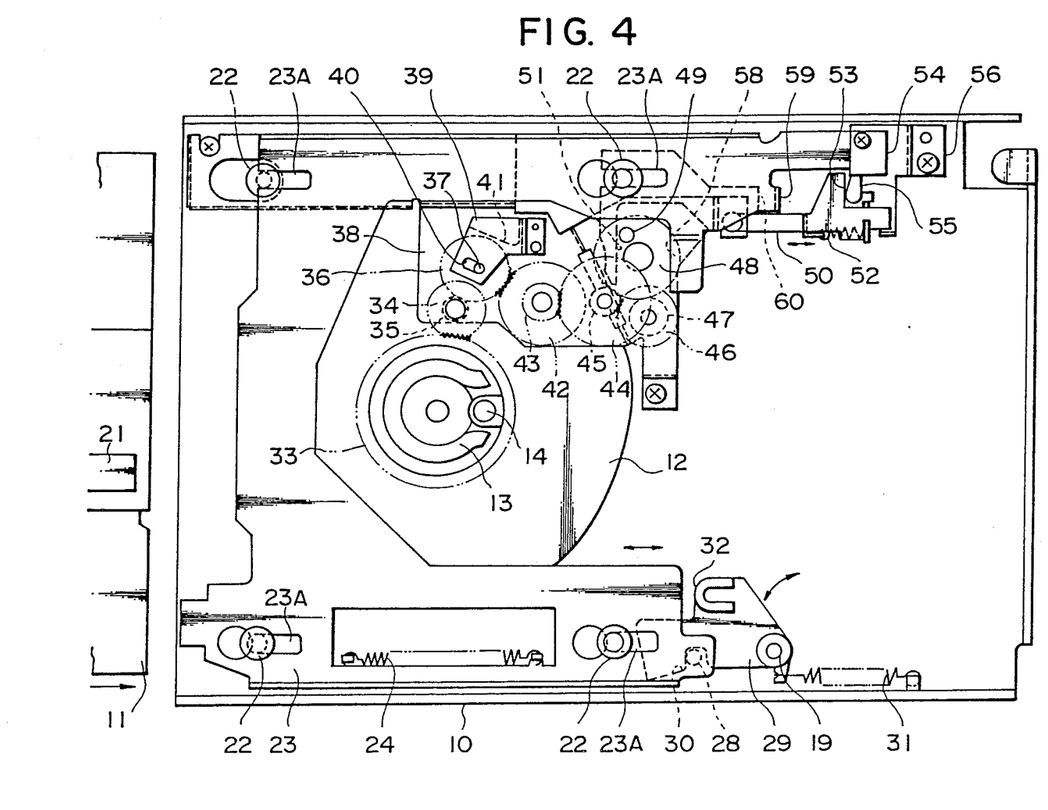
FIG. 4 is a plan view of an automatic magnetic recording medium ejecting mechanism, in a second embodiment, acccording to the present invention.
Figure 5:
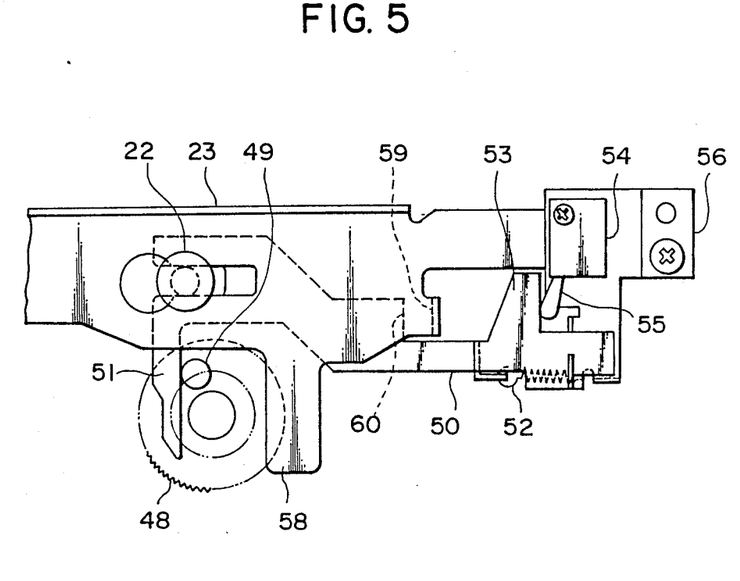
FIG. 5 is an enlarged plan view of a switch holding mechanism provided in the automatic magnetic recording medium ejection mechanism of FIG. 4.
Figure 6:
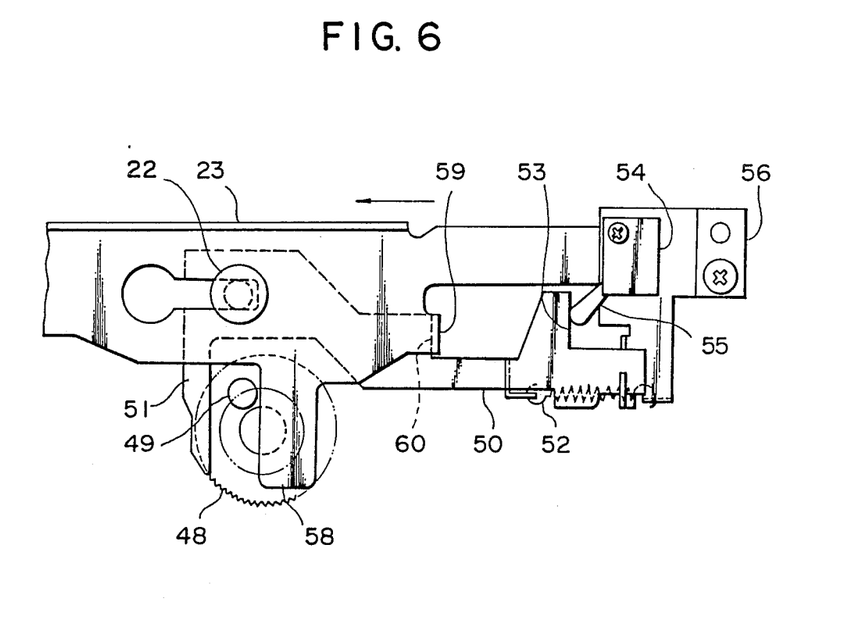

Second Embodiment:

An automatic magnetic recording medium ejecting mechanism, in a second embodiment, according to the present invention is illustrated in FIGS. 4 to 6. In FIGS. 4 to 6, parts similar to or corresponding to those previously described with reference to FIGS. 1 to 3 are denoted by the same reference numerals.

The second embodiment is substantially the same as the first embodiment in constitution and function, and hence the second embodiment will be described only in terms of constitution and function which are different from those of the first embodiment. Part of a U-shaped ejecting plate 23 near the right-hand end thereof is bent to form a finger 59, and a shoulder 60 is formed in a sliding member 50 so as to be located opposite to the finger 59. When a magnetic disk cassette 11 is inserted in the magnetic disk driving unit to cause the ejecting plate 23 to shift to the left from a position shown in FIG. 5, the finger 59 engages the shoulder 60 as shown in FIG. 6 to shift the sliding member 50 to the left. Consequently, projection 53 formed in the sliding member 50 is separated from the actuator 55 of a switch 54 to leave the switch 54 on while the magnetic disk cassette 11 is inserted in the magnetic disk driving unit. Accordingly, the automatic magnetic recording medium ejecting mechanism is actuated for an ejecting operation only by an ejection signal. The actuator 55 of the switch 54 may be operated so as to leave the switch 54 on by the ejecting plate 23.

As is apparent from the foregoing description, the gear mechanism is engaged or disengaged according to the direction of rotation of the spindle motor. When the spindle motor rotates in the normal direction for driving the magnetic disk, the gear mechanism is disengaged and hence the rotative power is not transmitted to the automatic magnetic recording medium ejecting mechanism. On the contrary, when the spindle motor rotates in the reverse direction for ejecting the magnetic disk cassette, the gear mechanism is engaged to transmit the rotative force of the spindle motor to the automatic magnetic recording medium ejecting mechanism. Thus, the automatic recording medium ejecting mechanism utilizes the spindle motor as a driving source, and hence any additional driving means is not necessary to incorporate the the automatic magnetic recording medium ejecting mechanism into a magnetic recording medium driving unit, so that the magnetic recording medium driving unit can be formed of a compact construction at an reduced cost.

Furthermore, since the switch for determining the timing for reversing the spindle motor for a magnetic disk cassette ejecting operation is held on to inhibit the reverse operation of the spindle motor while the magnetic disk cassette is placed in the magnetic disk driving unit, the magnetic disk cassette is not ejected even if the magnetic disk driving unit is connected to the power source after inserting the magnetic disk cassette in the magnetic disk driving unit or if power is supplied to the magnetic disk driving unit after the interruption of power supply to the magnetic disk driving unit during a read/write operation.

Although the invention has been described in its preferred form with a certain degree of particularity, many changes and variations are possible in the invention. It is therefore to be understood to those skilled in the art that the invention may be practiced otherwise than as specifically described, without departing from the spirit and scope thereof.

What is claimed is:

1. An automatic magnetic recording medium ejecting mechanism for use in combination with a magnetic recording medium driving unit, which comprises:

a cassette carrier for carrying a magnetic recording medium cassette inserted through an inlet opening in the magnetic recording medium driving unit to set the magnetic recording medium cassette at a predetermined operating position;

an ejecting plate for moving the cassette carrier in vertical directions;

pressing and locking means for pressing the magnetic recording medium cassette in an ejecting direction and for locking said ejecting plate at a standby position where said ejecting plate is held before a magnetic recording medium cassette is inserted in the magnetic recording medium driving unit;

driving means for rotatively driving the magnetic recording medium contained in the magnetic recording medium cassette inserted in the magnetic recording medium driving unit and for moving the ejecting plate to the standby position;

a gear mechanism which transmits the rotative force of said driving means to said ejecting plate only when said driving means is reversed to move the ejecting plate to the standby position and to make the pressing and locking means lock the ejecting plate at the standby position and press the magnetic recording medium cassette for ejection;

a switch for detecting the completion of operation of said driving means for moving the ejecting plate to the standby position; and a sliding member interlocked with said gear mechanism for controlling said switch.

2. An automatic recording medium ejecting mechanism according to claim 1, wherein said gear mechanism has a planetary pinion which is disengaged from an adjacent gear to disconnect a subsequent gear train from said driving means when said driving means operates in the normal direction for read/write operation, and comes into engagement with the adjacent gear to connect the subsequent gear train to said driving means when said driving means operates in the reverse direction.

3. An automatic magnetic recording medium ejecting mechanism according to claim 1, wherein said driving means is the spindle motor of the magnetic recording medium driving unit.

4. An automatic magnetic recording medium ejecting mechanism for use in combination with a magnetic recording medium driving unit, which comprises:

a cassette carrier for carrying a magnetic recording medium cassette inserted through an inlet opening in the magnetic recording medium driving unit to set the magnetic recording medium cassette at a predetermined operating position;

an ejecting plate for moving said cassette carrier in vertical directions;

pressing and locking means for pressing the magnetic recording medium cassette in an ejecting direction and for locking said ejecting plate at a standby position where said ejecting plate is held before a magnetic recording medium cassette is inserted in the magnetic recording medium driving unit;

driving means for rotatively driving the magnetic recording medium contained in the magnetic recording medium cassette inserted in the magnetic recording medium driving unit and for moving the ejecting plate to the standby position;

a gear mechanism which transmits the rotative force of said driving means to said ejecting plate only when said driving means is reversed to move said ejecting plate to the standby position and to make said pressing and locking means lock the ejecting plate at the standby position and press the magnetic recording medium cassette for ejection;

a switch for detecting the completion of operation of said driving means for moving said ejecting plate to the standby position;

a sliding member interlocked with the gear mechanism for controlling the switch; and switch holding means which operates in synchronism with the magnetic recording medium cassette receiving operation of said ejecting plate to hold the switch on while the magnetic recording medium cassette is inserted in the magnetic recording medium driving unit to inhibit the ejection of the magnetic recording medium cassette except when an ejection command signal is given.

5. An automatic magnetic recording medium ejecting mechanism according to claim 4, wherein said gear mechanism has a planetary pinion which is disengaged from an adjacent gear to disconnect a subsequent gear train from said driving means when said driving means operates in the normal direction for read/write operation, and comes into engagement with the adjacent gear to connect the subsequent gear train to said driving means when said driving means operates in the reverse direction.

6. An automatic magnetic recording medium ejecting mechanism according to claim 4, wherein said driving means is the spindle motor of the magnetic recording medium driving unit.

* * * * *